No. 794,362. PATENTED JULY 11, 1905.
B. G. LAMME.
ELECTRIC MOTOR.
APPLICATION FILED MAY 3, 1904.

WITNESSES:
Fred. H. Miller
Otto S. Schairer

INVENTOR
Benjamin G. Lamme
BY
Wesley G. Carr
ATTORNEY

No. 794,362.

Patented July 11, 1905.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR.

SPECIFICATION forming part of Letters Patent No. 794,362, dated July 11, 1905.

Application filed May 3, 1904. Serial No. 206,186.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Electric Motors, of which the following is a specification.

My invention relates to electric motors, and particularly to such motors as may be operated by means of either alternating or direct current energy.

My invention has for its object to provide means for automatically changing the value of the ampere-turns in the field-magnet winding of a motor when a change in the supply of energy is made from direct current to alternating current, and vice versa.

Electric motors may be constructed which will operate satisfactorily on either alternating or direct current; but such motors do not ordinarily operate under the best conditions in either case, for the reason that when operating on alternating current it is desirable that the ampere-turns in the field-magnet windings should be relatively low, but when operating on direct current the ampere-turns in the field-magnet windings should be much higher in value.

By the utilization of certain of the properties of alternating currents, or, in other words, by means of suitable arrangements of reactances and resistances or windings having different time constants, it is possible to provide different conditions of operation by means of alternating currents from those which obtain when operating by means of direct currents—that is, it is possible to obtain a higher value for the ampere-turns in the field-magnet winding when operating by means of direct currents than the corresponding values when operating by means of alternating currents.

My invention provides suitable means for changing the value of the ampere-turns in the field-magnet windings of one or more electric motors which may be supplied from either an alternating or a direct current source and is illustrated in the accompanying drawings, in which—

Figure 1:
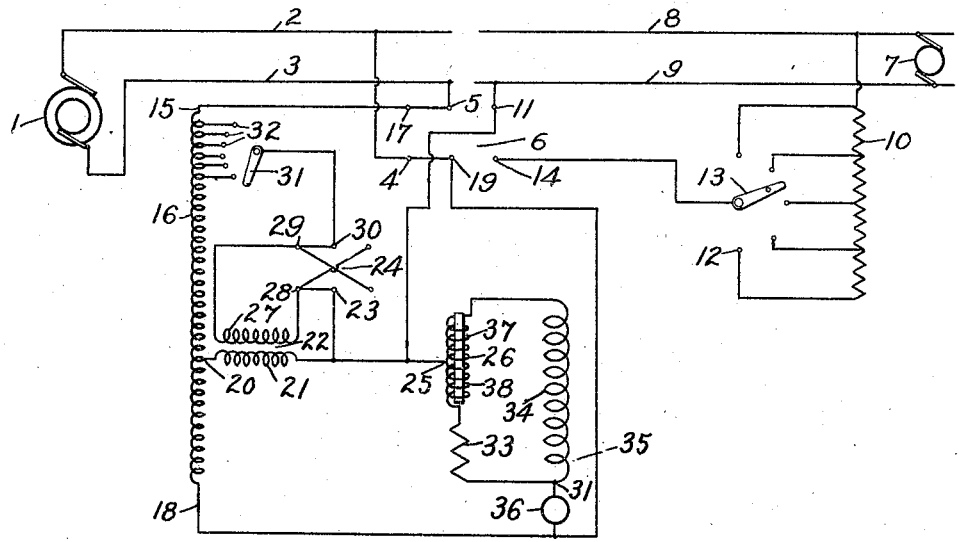
Figure 2:
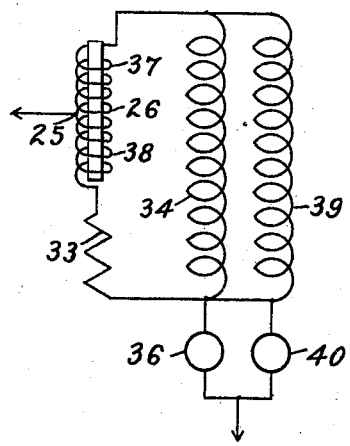

Figure 1 represents a system embodying a motor constructed in accordance therewith, and Fig. 2 is a modification of the arrangement shown in Fig. 1.

Alternating-current energy is supplied from any suitable source 1 to distributing-conductors 2 and 3, which are respectively connected with terminals 4 and 5 of a double-throw switch 6, and direct-current energy is supplied from any suitable source 7 to distributing-conductors 8 and 9, which are respectively connected with subdivided resistance element 10 and terminal 11 of the switch 6. The various subdivisions of the resistance element 10 are connected, respectively, to contact terminal pieces 12, with which an arm 13 is adapted to engage, the arm being connected with terminal 14 of the switch 6. The parts 10, 12, and 13 constitute the elements of the controlling system that are peculiar to direct-current operation of the motors and of course are merely indicative of any operative means that is suitable for direct-current service.

The controlling apparatus that is peculiar to alternating-current operation will be now described in connection with the apparatus that is used in connection with both direct and alternating current operation. One terminal 15 of a transformer-winding 16 is connected with terminal piece 17 of the switch 6, and the other terminal 18 is connected with terminal piece 19 of the switch 6. Connected with a point 20 intermediate the terminals of the winding 16 is one terminal of a secondary winding 21 of a series transformer 22, the other terminal of the winding 21 being connected to terminal piece 23 of a switch 24, to terminal piece 11 of switch 6, and to a point 25 in an inductive winding 26. The terminals of the primary winding 27 of the series transformer 22 are connected, respectively, to terminal pieces 28 and 29 of the switch 24, and terminal piece 30 of the switch 24 is connected to a switch-arm 31, that serves to make connection with any one of several spaced leads 32, with which the transformer-winding 16 is provided.

In series with the inductive winding 26 is a non-inductive resistance 33, these two windings being connected in parallel with field-magnet winding 34 of a motor 35, which has its armature 36 connected in series with its field-magnet winding 34. One armature-terminal of the motor 35 is connected to the terminal 18 of the transformer-winding 16, and its other terminal is connected to one terminal of the non-inductive resistance 33, as well as to one terminal of the field-magnet winding 34.

Assuming that the switch 6 is in the position shown in full lines—*i. e.*, in position to connect the terminal pieces 5 and 19, respectively, with terminal pieces 17 and 4—alternating-current energy will be supplied to the motor 35 and will be divided at the point 25, one portion passing through section 37 of the inductive winding 26 and through both the field-magnet winding 34 and the armature 36 and an approximately equal portion passing through the section 38 of the winding 26, the non-inductive winding 33, and the armature 36. If the switch 6 is in its other extreme position, so as to connect terminal pieces 5 and 19, respectively, with the terminal pieces 11 and 14, direct-current energy will be supplied to the motor 35 through the rheostatic controller 10 12 13; but since a considerable resistance is offered by the non-inductive winding 33 to the passage of the current through that portion of the circuit the greater portion of the current will be directed through the portion 37 of the inductive winding 26 and through both the field-magnet winding 34 and the armature 36, so that the value of the ampere-turns in the field-magnet winding 34 may be higher than in the case just described when the motors are operated by means of alternating currents.

The relative proportions of the two sections 37 and 38 of the inductive winding 26 and the non-inductive winding 33 may be so adjusted that the values of the ampere-turns in the field-magnet winding 34 shall be approximately those corresponding to the most economical or efficient operation of the motor 35, whether the motor be operated by means of alternating or direct currents.

While the diagrammatic illustration of the system does not permit of an accurate presentation of the form and dimensions of its various elements, it is to be understood that the ohmic resistance of the device 33 should be greater than that of the field-magnet winding 34 in order that the larger portion of the current may be caused to traverse the field-magnet winding 34 when the motor is being supplied with direct-current energy. The ohmic resistance of the winding 26 should be small in comparison with its inductive resistance for the purpose of avoiding undue loss of energy in that winding, especially when direct-current energy is being supplied to the motor. When alternating-current energy is employed in the operation of the motor, approximately equal currents traverse the sections 37 and 38 of the winding 26, because these sections are wound upon the same core in inductive relation to each other, and consequently the number of field ampere-turns is less than when the motor is operated by direct currents. This operating condition obtains even though the sections 37 and 38 are of unequal ohmic resistance, since the mutual induction serves to substantially overcome the tendency of the current to divide between the sections in inverse ratio to their ohmic resistance.

While the system shown in Fig. 1 embodies only a single motor equipped with my invention, I desire it to be understood that it may be employed for the operation of two or more motors, as is shown in Fig. 2, in which field-magnet windings 34 and 39 are connected in parallel with each other and armatures 36 and 40 are also connected in parallel with each other. It is evident that other arrangements of the windings 34, 39, 36, and 40 are possible within the scope of my invention.

The devices shown in Fig. 1 for varying the voltages supplied to the motor are presented as suitable means for the purpose; but it is not intended to limit the invention to any one specific means for effecting the desired voltage variations.

It is to be understood that my invention is not restricted to the specific use in connection with motors which I have shown and described, but is capable of application broadly to all types of apparatus which may be operated by either alternating or direct current energy.

I claim as my invention—

1. The combination with a source of alternating-current energy, a source of direct-current energy and a motor having series-connected armature and field-magnet windings, of means for causing the ampere-turns in the field-magnet winding to assume a higher value when the motor is operated by direct currents than when it is operated by alternating currents.

2. The combination with a source of alternating-current energy, a source of direct-current energy and a motor having series-connected armature and field-magnet windings, of means for automatically causing the ampere-turns in the field-magnet winding to assume a higher value when the motor is operated by direct currents than when it is operated by alternating currents.

3. The combination with a source of alternating-current energy, a source of direct-current energy and a motor having series-connected armature and field-magnet windings, of means for automatically causing the ampere-turns in the field-magnet winding to assume a higher value when the motor is operated by direct currents than when it is operated by alternating currents, said means comprising an inductive winding having a lead connected to a point therein which is intermediate its terminals and having a terminal connected with a terminal of the field-magnet winding, and a non-inductive resistance in series with the inductive winding and having one terminal connected to the terminals of the field-magnet and armature windings which are connected together.

4. The combination with a motor having series-connected armature and field-magnet windings, of an inductive winding and a non-inductive resistance which are connected in series with each other and in parallel with the motor field-magnet winding, and a terminal lead which is connected to a point in the inductive winding which is intermediate its terminals.

5. The combination with a source of electrical energy and a motor having series-connected armature and field-magnet windings, of an inductive winding and a non-inductive resistance which are connected in series with each other and in parallel with the motor field-magnet winding, one terminal of the non-inductive resistance being connected to the terminals of the armature and field-magnet windings which are connected together, and means for connecting a point in the inductive winding which is intermediate its terminals to the source of electrical energy.

6. The combination with a source of alternating-current energy and a source of direct-current energy, of a motor having series-connected armature and field-magnet windings, an inductive winding and a non-inductive winding connected in series with each other and in parallel with the field-magnet winding, and means for connecting one terminal of the armature-winding and a point intermediate the terminals of the inductive winding to the respective terminals of the one or the other of said sources of energy.

7. The combination with a source of alternating-current energy and a source of direct-current energy, of a motor having series-connected armature and field-magnet windings, an inductive winding and a non-inductive resistance connected in series with each other and in parallel with the motor field-magnet winding, one terminal of the non-inductive resistance being connected to the terminals of the armature and field-magnet windings which are connected together, and the other terminal of the armature-winding and a point in the inductive winding intermediate its terminals being connected to the respective terminals of the one or the other of said sources of energy.

8. The combination with a source of alternating-current energy, a source of direct-current energy and a motor having series-connected armature and field-magnet windings, of means for automatically causing the ampere-turns in the field-magnet winding to assume a higher value when the motor is operated by direct currents than when it is operated by alternating currents, said means comprising a circuit in two portions one of which offers greater resistance to the passage of direct currents than the other, said portions being connected in parallel with the field-magnet winding and being connected at an intermediate point to the source of energy.

9. The combination with a source of alternating-current energy, a source of direct-current energy and a motor having series-connected armature and field-magnet windings, of means for automatically causing the ampere-turns in the field-magnet winding to assume a higher value when the motor is operated by direct currents than when it is operated by alternating currents, said means comprising a circuit in two portions one of which offers greater resistance to the passage of direct currents than the other, said portions being connected in parallel with the field-magnet winding and being connected at an intermediate point to the source of energy, the outer terminal of the portion of the circuit having the greater resistance being connected to the terminals of the armature and field-magnet windings which are connected together.

10. The combination with a source of alternating-current energy, a source of direct-current energy and one or more motors having series-connected armature and field-magnet windings, of means for causing the ampere-turns in the field-magnet windings to assume higher values when the motors are operated by direct currents than when operated by alternating currents, comprising an inductive winding having an intermediate point connected to the source of energy and having one terminal connected to a terminal of the field-magnet winding, and a non-inductive resistance connected in series with the inductive winding and having one terminal connected to the terminals of the field-magnet and armature windings which are connected together.

11. The combination with a source of alternating-current energy, a source of direct-current energy and a suitable translating device or devices, of means for causing different amounts of current to be supplied to said device or devices according to the character of the energy supplied.

12. The combination with a source of alternating-current energy, a source of direct-current energy and a suitable translating device or devices, of means for automatically effecting an increase in the amount of direct current supplied to said device or devices relative to the amount of alternating current supplied thereto.

13. The combination with a source of alternating-current energy, a source of direct-current energy and a suitable translating device or devices, of means for automatically effecting an increase in the amount of direct current supplied to said device or devices relative to the amount of alternating current supplied thereto comprising an inductive winding and an ohmic resistance connected in series with each other and in parallel with the translating device or devices, a terminal connection being made to a point in the inductive winding intermediate its ends.

14. The combination with a source of alternating-current energy, a source of direct-current energy, and a translating device, of means for automatically adjusting the amount of current supplied to the translating device in accordance with the kind of current.

15. The combination with a source of alternating-current energy, a source of direct-current energy, and a translating device, of an interposed device that insures a supply of current to the translating device that differs in amount according to its kind.

16. The combination with a source of alternating-current energy, a source of direct-current energy and a suitable translating device or devices, of means for effecting an increase in the amount of direct current supplied to said device or devices relative to the amount of alternating current supplied thereto.

In testimony whereof I have hereunto subscribed my name this 13th day of April, 1904.

BENJ. G. LAMME.

Witnesses:
E. M. STEWART,
BIRNEY HINES.